(12) United States Patent (10) Patent No.: US 8,719,151 B2
Liu et al. (45) Date of Patent: May 6, 2014

(54) LOAN RESOLUTION MODELING USING DISCRETE EVENT SIMULATION METHODOLOGY

(75) Inventors: Yang Liu, Charlotte, NC (US); Willys Otieno, Charlotte, NC (US); Steven W. Lindsey, Charlotte, NC (US); Minzhe Wu, Thousand Oaks, CA (US)

(73) Assignee: Bank of America Corporation, Charlotte, NC (US)

( * ) Notice: Subject to any disclaimer, the term of this patent is extended or adjusted under 35 U.S.C. 154(b) by 397 days.

(21) Appl. No.: 13/115,710

(22) Filed: May 25, 2011

(65) Prior Publication Data

US 2012/0254061 A1 Oct. 4, 2012

Related U.S. Application Data

(60) Provisional application No. 61/469,453, filed on Mar. 30, 2011.

(51) Int. Cl.
*G06Q 40/00* (2012.01)
(52) U.S. Cl.
USPC .............................................. 705/38; 705/35
(58) Field of Classification Search
USPC ..................................................... 705/38, 35
See application file for complete search history.

(56) References Cited

U.S. PATENT DOCUMENTS

2011/0078073 A1* 3/2011 Annappindi ..................... 705/38
2012/0278217 A1* 11/2012 Sui et al. ......................... 705/35

OTHER PUBLICATIONS

Economics Week; "Bank of America corporation; Researchers Submit Patent Application; "Loan Resolution Modeling Using Discrete Event Simulation Methodology", for Approval"; Oct. 26, 2012.*
Bonaccorsi, Andrea; Carmignani, Gionata; Zammori, Francesco. "Service Value Stream Management (SVSM): Developing Lean Thinking in the service Industry"; Journal of Service Science and Management; Dec. 2011.*

* cited by examiner

*Primary Examiner* — Edward Chang
(74) *Attorney, Agent, or Firm* — Michael A. Springs; Moore & Van Allen PLLC; James C. Edwards (57) ABSTRACT

Systems, methods, and computer program products are provided for customer loan lifecycle modeling using discrete event simulation methodology. Discrete Event Simulation (DES) allows for modeling to occur at the customer and/or account level, such that the process captures customer-specific or loan-specific attributes/exposure factors, such as, but not limited to, credit score(s), House Price Index (HPI), loan product type, unemployment rates, interest rates and the like. Such modeling takes into the account that loan events occur at random paces and are typically dependent on ancillary factors, such as, availability of financial resources, market demand, customer attributes and the like, which all tend to be stochastic by nature.

23 Claims, 7 Drawing Sheets

LOAN RESOLUTION MODELING USING DISCRETE EVENT SIMULATION METHODOLOGY

FIELD

In general, embodiments herein disclosed relate to financial institution loan management and, more specifically loan resolution modeling using discrete event simulation methodologies.

BACKGROUND

Currently financial institution customer loan resolution modeling is conducted at the aggregate level. Aggregate level modeling assumes that a certain segment of the overall loan population behaves a certain way and based on those behaviors predicts how that segment will behave for the area of interest. For loan resolution modeling, aggregate level processing, determines how a specific segment of the overall financial customer population is likely to resolve the loan within a predefined period of time.

In loan resolution, many events may occur within the life of the loan, for example, events related to the current/late state of the loan, such as staying current on loan payment, becoming late on loan payment and events related to servicing of the loan, such as modification/short sale of the loan, a bankruptcy by the customer, foreclosure/Real Estate Owned (REO), becoming the potential workout population and the like. Each of these events tend to occur at random times throughout the life of the loan and may depend on other factors, such as availability of financial resources, market demand, and customer attributes, which are also stochastic by nature.

Therefore, a need exists to develop systems, methods, computer program products and the like which model loan resolution at the individual customer and/or account level as opposed to at the aggregate level. Such loan resolution modeling needs to be able to capture the stochastic nature of the events that occur within the loan lifecycle. The desired solution should take into account not only the randomness of the events but also the complexity, interdependency and importance of timing.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

Methods, apparatus systems and computer program products are described herein that provide for financial institution loan lifecycle modeling using Discrete Event Simulation (DES) methodology. DES allows for modeling to occur at the customer and/or account level, such that the process captures customer-specific or loan-specific attributes/exposure factors, such as, but not limited to, credit score(s), House Price Index (HPI), loan product type, unemployment rates, interest rates and the like. Such modeling recognizes that loan events occur at random paces and are typically dependent on ancillary factors, such as, availability of financial resources, market demand, customer attributes and the like, which all tend to be stochastic by nature. Such loan resolution modeling provides financial institutions tremendous opportunities for making informed management decisions that impact customer service.

A method for providing loan resolution modeling defines first embodiments of the invention. The method includes identifying a current loan state for one or more financial institution loan accounts and predicting a future loan state for each of the one or more financial institution loan accounts. The future loan state is for a predetermined time interval, such as a month or the like. In addition, Discrete Event Simulation processing is implemented to determine the future loan state.

In specific embodiments of the method, predicting the future loan state further includes predicting the future loan state based on historical aggregated loan account data. In other specific embodiments of the method, predicting the future loan state further includes predicting the future loan state for each of the one or more loan accounts based on historical loan account-specific data.

In further specific embodiments of the method, predicting the future loan state further includes predicting the future loan state based on one or more predictive dynamic loan variables. The dynamic loan variables may include, but are not limited to, interest rates, unemployment rates, market-to-market combined loan-to-value, loan age, home price index, home price momentum or payment shock. In still other specific embodiments of the method, predicting the future loan state further includes predicting the future loan state based on one or more predictive static loan variables. The static loan variables may include, but are not limited to, credit scores, origination loan-to-value, origination combined loan-to-value, loan age, household income, occupancy status, loan product type, loan purpose, loan amount, amortization term, property type or number of borrowers.

In still further specific embodiments of the method identifying the current loan state further comprises identifying, via the computing device processor, the current loan state based on currency or lateness of the one or more loan accounts.

In yet other specific embodiments the method further includes identifying, for each of the one or more loan accounts, a current loan state grouping from amongst a plurality of current loan state groupings. In such embodiments the plurality of current loan state groupings may include a first grouping that includes loan accounts currently less than ninety days late (e.g. current, 30 days late or 60 days late), a second grouping that includes loan accounts currently ninety to one hundred and seventy-nine days late (e.g., 90 days late, 120 days late or 150 days late) and a third grouping that includes loan accounts currently greater than or equal to one hundred and eighty days late (e.g., 180 days late, 210 days late, and the like). In such embodiments of the method, predicting the future loan state further include predicting the future loan state for each of the one or more loan accounts based on the identified current loan state grouping.

In additional specific embodiments of the method, identifying the current loan state further includes identifying a plurality of existing loan accounts and a plurality of planned new loan accounts opening during an ensuing time period defined by the predetermined time interval.

An apparatus for modeling loan resolution provides for second embodiments of the invention. The apparatus includes a computing platform including a processor and a memory in communication with the processor. The apparatus additionally includes a loan resolution application stored in the memory and executable by the processor. The loan resolution application is further configured to identify a current loan state for each of one or more financial institution loan accounts and predict a future loan state for each of the one or more financial institution loan accounts based on the current loan state. The future loan state is for a predetermined time interval, such as a month or the like. In addition, Discrete Event Simulation (DES) processing is implemented to determine the future loan state.

In specific embodiments of the apparatus, the loan resolution application is further configured to predict the future loan state based on historical aggregated loan account data. In still further embodiments of the apparatus, the loan resolution application is further configured to predict the future loan state for each of the one or more loan accounts based on historical loan account-specific data.

In other specific embodiments of the apparatus, the loan resolution application is further configured predict the future loan state based on one or more predictive dynamic loan variables. The dynamic loan variable may include, but are not limited to, interest rates, unemployment rates, market-to-market combined loan-to-value, loan age, home price index, home price momentum or payment shock. In still further specific embodiments of the apparatus, the loan resolution application is further configured to predict the future loan state based on one or more predictive static loan variables. The static loan variables may include, but are not limited to, credit scores, origination loan-to-value, origination combined loan-to-value, loan age, household income, occupancy status, loan product type, loan purpose, loan amount, amortization term, property type or number of borrowers.

In still further specific embodiments, the loan resolution application includes an initialization module configured to identify the current loan state for each of the one or more loans based on loan inventory data and planned new loan accounts.

In still further specific embodiments of the apparatus, the loan resolution application is further configured to identify, for each of the one or more loan accounts, a current loan state grouping from amongst a plurality of current loan state groupings. In such embodiments of the apparatus, the loan resolution application further includes a loan migration module configured to predict the future loan state of loan accounts currently residing in a loan state grouping defined by loan accounts currently less than ninety (90) late (e.g. current, 30 days late or 60 days late). In further related embodiments of the apparatus, the loan resolution application further includes a loan weave module configured to predict the future loan state of loan accounts currently residing in a loan state grouping defined by loan accounts currently ninety (90) to one-hundred and seventy-nine (179) days late (e.g., 90 days late, 120 days late or 150 days late). Moreover, in still further related embodiments of the apparatus, the loan resolution application further includes a loan resolution module configured to predict the future loan state of loan accounts currently residing in a loan state grouping defined by loan accounts greater than or equal to one-hundred and eighty (180) days late (e.g., 180 days late, 210 days late, and the like).

A computer program product including a non-transitory computer-readable medium defines third embodiments of the invention. The computer-readable medium includes a first set of codes for causing a computer to identify a current loan state for one or more financial institution loan accounts> The computer-readable medium additionally includes a second set of codes for causing a computer to predict a future loan state for each of the one or more financial institution loan accounts based on the current loan state. The future loan state is for a predetermined time interval. In addition, Discrete Event Simulation (DES) processing is implemented to determine the future loan state.

Thus, embodiments of the invention are described in greater detail below that provide for financial institution loan lifecycle modeling using Discrete Event Simulation (DES) methodology. DES allows for modeling to occur at the customer and/or account level, as opposed to an aggregate level, such that the process captures customer-specific or loan-specific attributes/exposure factors, such as, but not limited to, credit score(s), House Price Index (HPI), loan product type, unemployment rates, interest rates and the like.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Having thus described embodiments of the invention in general terms, reference will now be made to the accompanying drawings, which are not necessarily drawn to scale, and wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

Various embodiments or features will be presented in terms of systems that may include a number of devices, components, modules, and the like. It is to be understood and appreciated that the various systems may include additional devices, components, modules, and the like and/or may not include all of the devices, components, modules and the like discussed in connection with the figures. A combination of these approaches may also be used.

The steps and/or actions of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some embodiments, the processor and the storage medium may reside in an Application Specific Integrated Circuit (ASIC). In the alternative, the processor and the storage medium may reside as discrete components in a computing device. Additionally, in some embodiments, the events and/or actions of a method or algorithm may reside as one or any combination or set of codes and/or instructions on a machine-readable medium and/or computer-readable medium, which may be incorporated into a computer program product.

In one or more embodiments, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures, and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. "Disk" and "disc", as used herein, include compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

Thus, methods apparatus systems and computer program products are described herein that provide for loan lifecycle modeling using Discrete Event Simulation Methodology. Discrete Event Simulation (DES) is a dynamic simulation process in which the operation of a system (in this instance, resolution of a loan) is represented by a sequence of event. Each event occurs at an instant in time, thus the discrete aspect of the simulation and marks a change of state in the resolution of the loan. In specific embodiments of the invention, the events that result in a change in state are financial institution-related events, such as changes in loan lateness status or changes in loan servicing status. The result of the loan resolution processing of the present invention is a prediction, based on a predetermined probability that an event will occur, of the future state of the loan during the ensuing predetermined time interval (e.g., the next month). The future state of the loan may be the same state as the current state of the loan or the loan may move in terms of lateness status and/or servicing status. As such, the loan resolution modeling of the present invention, allows for modeling to occur at the customer and/or account level, such that the process captures customer-specific or loan-specific attributes/exposure factors, such as, but not limited to, credit score(s), House Price Index (HPI), loan product type, unemployment rates, interest rates and the like. Further, such loan modeling takes into account that loan events occur at random paces and are typically dependent on ancillary factors, such as, availability of financial resources, market demand, customer attributes and the like, which all tend to be stochastic by nature. Such modeling and understanding of the customer relationship lifecycle and specifically in terms of loan resolution lifecycle, provides financial institutions tremendous opportunities for making informed management decisions that impact customer service.

Figure 1:
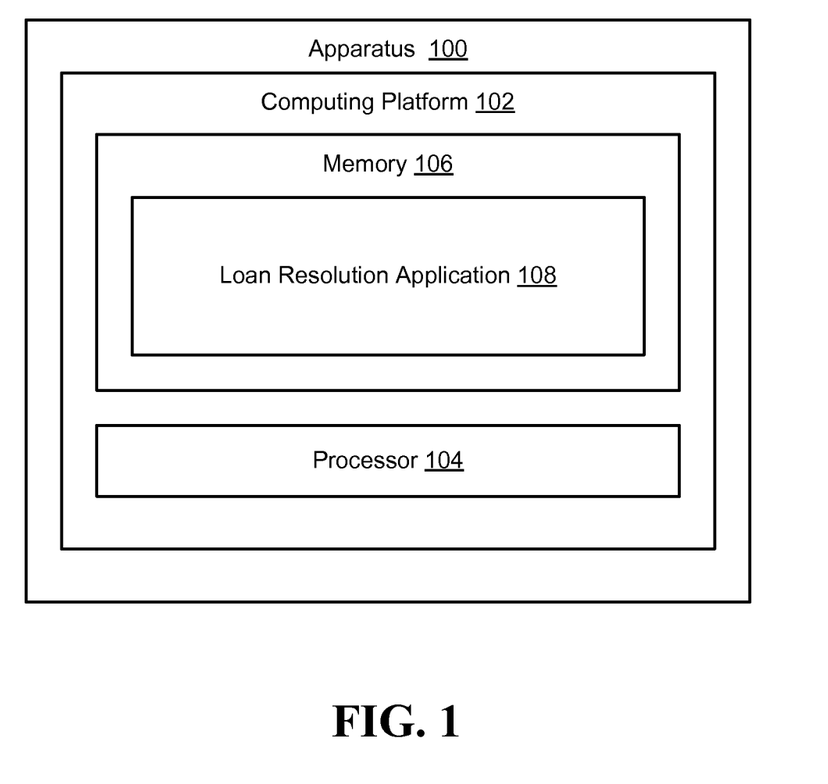
FIG. 1 is a block diagram of an apparatus configured to provide loan resolution predictions, in accordance with embodiments of the present invention.

Referring to FIG. 1, a block diagram is presented of an apparatus 100 configured to provide loan resolution predictions using Discrete Event Simulation (DES) processing, in accordance with embodiments of the present invention. The apparatus includes a computing platform 102 having a processor 104 and a memory 106 in communication with the processor 104. The memory 104 of apparatus 100 stores loan resolution application 108 which is executable by processor 104 and configured to identify the current loan state for one or more financial institution loans and predict, using DES processing, the future state of a loan for a predetermined time interval, such as a month in the future or the like, based on the current loan state.

In specific embodiments of the invention, loan resolution modeling is conducted by a financial institution or other loan providing entity on a regular schedule, such as monthly or the like, such that the financial institution or other loan providing entity can predict where the loan will reside in the future, for example, where the loan will reside a month from now, in terms of lateness and/or servicing status. In such embodiments, the financial institution or other loan providing entity typically conducts loan resolution modeling on the entire loan population, or a significant portion of the loan population, such as all consumer loans or the like. In other embodiments of the invention, it may be possible and advantageous to conduct loan resolution modeling on a small subset of loans or one specific loan to predict the future state of the subset of loans or single loan. The subset of loans being identified based on any loan criteria as defined by the user.

In those embodiments in which the entire loan population or a significant portion of the loan population is modeled for loan resolution in accordance with the methodology herein disclosed, the result of the process is a specific predicted future loan state for each specific loan in the overall population. It should be noted that in those embodiments of the invention in which the predictions are based solely on historical aggregated loan data (i.e., not based on customer/account-specific data), the resulting specific predicted future loan state for each specific loan is used by the financial institution or loan providing entity for the overall management/forecasting of the loan portfolio and not for the purpose of taking specific action at the account or customer level. This is because that while the result of the process is a predicted state at the loan-level, i.e., a prediction for each loan account in the overall portfolio, the assignment of a specific predicted future loan state is random.

As previously mentioned, in specific embodiments of the invention future loan state predictions are based, solely or in part, on historical aggregated loan data. The historical aggregated loan data may include both dynamic predictive variables and static predictive variable. Example of dynamic predictive variables include, but are not limited to, interest rates, unemployment rates, Market-to-Market Combined Loan-to-Value (MCLTV), Home Price Index (HPI), home price momentum, loan age, payment shock and the like. Examples of static predictive variables include, but are not limited to, credit scores, such as Fair Isaac Corporation (FICO) scores and the like, origination Loan-to-Value (LTV), origination CLTV, loan age, loan product type, household income, occupancy status, loan purpose, loan size, amortization term, property type, number of borrowers associated with the loan and the like. In other alternate embodiments of the invention, future loan state predictions may additionally be based on account-specific or customer-specific loan data, such as specific loan account performance data, specific customer profile data or the like.

Figure 2:
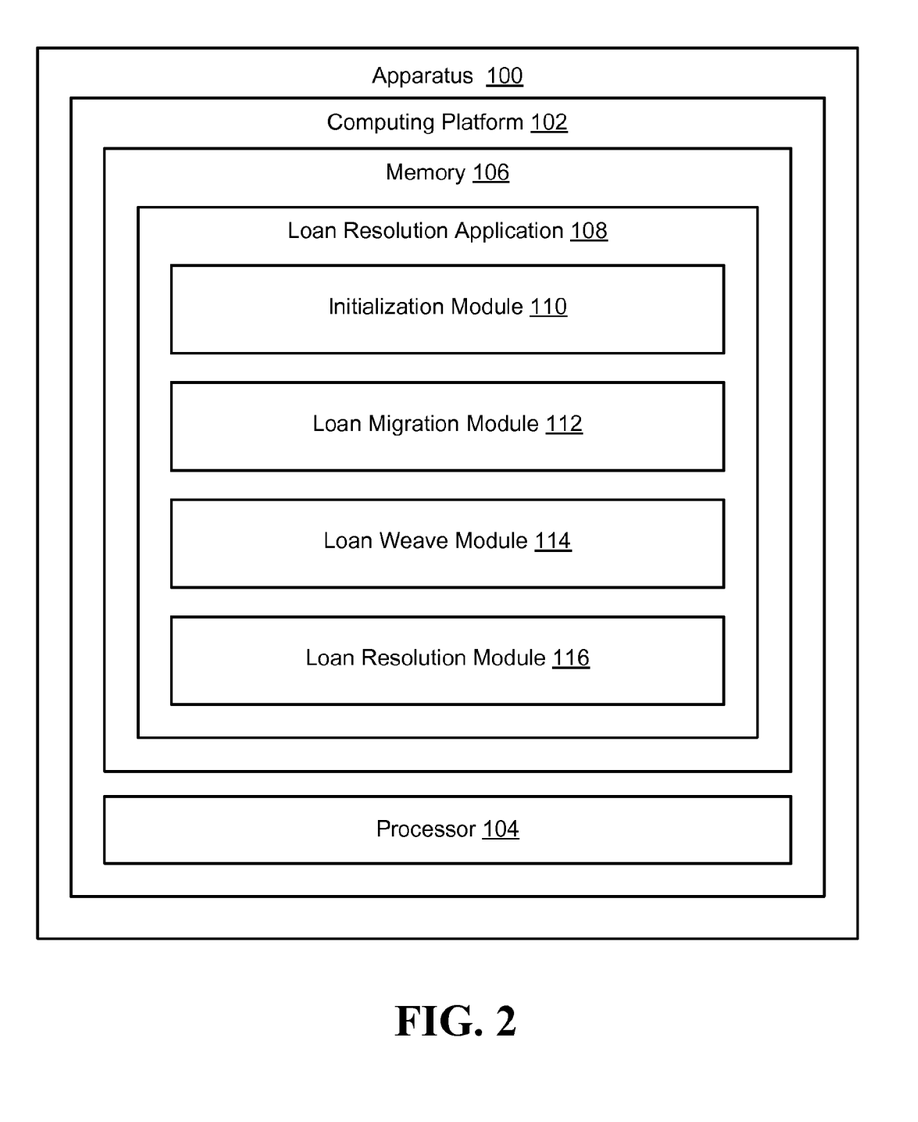
FIG. 2 is a block diagram of an apparatus configured to provide loan resolution predictions highlighting additional features, in accordance with embodiments of the present invention.

FIG. 2 is a more detailed block diagram depiction of the apparatus 100, in accordance with embodiments of the present invention. In addition to providing greater detail, FIG. 2 highlights various alternate embodiments of the invention. The apparatus 100 may include any type of one or more computerized, communication devices, such as server(s), personal computer(s), portable computer(s), or any device or devices that include a computer platform 102 and may have a wired and/or wireless connection to a network, such as an intranet or the like.

The apparatus 100 includes computing platform 102 that may be configured to transmit data across a network, and that can receive and execute routines and applications, such as loan resolution application 108. Computing platform 102 includes memory 106, which may comprise volatile and non-volatile memory such as read-only and/or random-access memory (RAM and ROM), EPROM, EEPROM, flash cards, or any memory common to computing platforms. Further, memory 106 may include one or more flash memory cells, or may be any secondary or tertiary storage device, such as magnetic media, optical media, tape, or soft or hard disk.

Further, computing platform 102 also includes processor 104, which may be an application-specific integrated circuit ("ASIC"), or other chipset, processor, logic circuit, or other data processing device. Processor 104 or other processor such as ASIC may execute an application programming interface ("API") layer (not shown in FIG. 2) that interfaces with any resident programs, such as loan resolution application 108 stored in the memory 106 of the apparatus 100.

Processor 106 includes various processing subsystems (not shown in FIG. 2) embodied in hardware, firmware, software, and combinations thereof, that may enable the functionality of apparatus 100 and the operability of the apparatus 100 on a network. For example, processing subsystems allow for initiating and maintaining communications, and exchanging data, with other networked devices. For the disclosed embodiments, processing subsystems of processor 100 may include any subsystem used in conjunction with loan resolution application 108.

In accordance with specific embodiments, the loan resolution application 108 includes data initialization module 110, loan mitigation module 112, loan weave module 114 and loan resolution module 116. In such embodiments of the invention multiple modules may be necessary to segment out primary probability drivers. For example, in the loan mitigation module 112, the lateness status is the primary probability driver and only one servicing status (i.e., bankruptcy) is tracked. In the loan weave module 114 both the loan's lateness status and the servicing status are tracked, while in the loan resolution module 116 only the loan's servicing status is tracked via the month leading into that particular servicing status.

Data initialization module 110 is configured to receive or assess current loan account data and, in some embodiments, planned new loan account data to identify the current loan state for one or more financial institution loans. Planned new loan account data includes data related to loans that have been processed but which will be opened during the ensuing prediction period (e.g., the ensuing month or the like). In specific embodiments in which loan resolution predictions are determined on a predetermined schedule, such as monthly or the like, the data initialization module 110 is configured to receive/assess the current and planned loan account data on a likewise predetermined schedule, such as month-end or the like, to identify the current loan state for each loan account in the financial institution or loan providing entity's loan portfolio.

Figure 4:
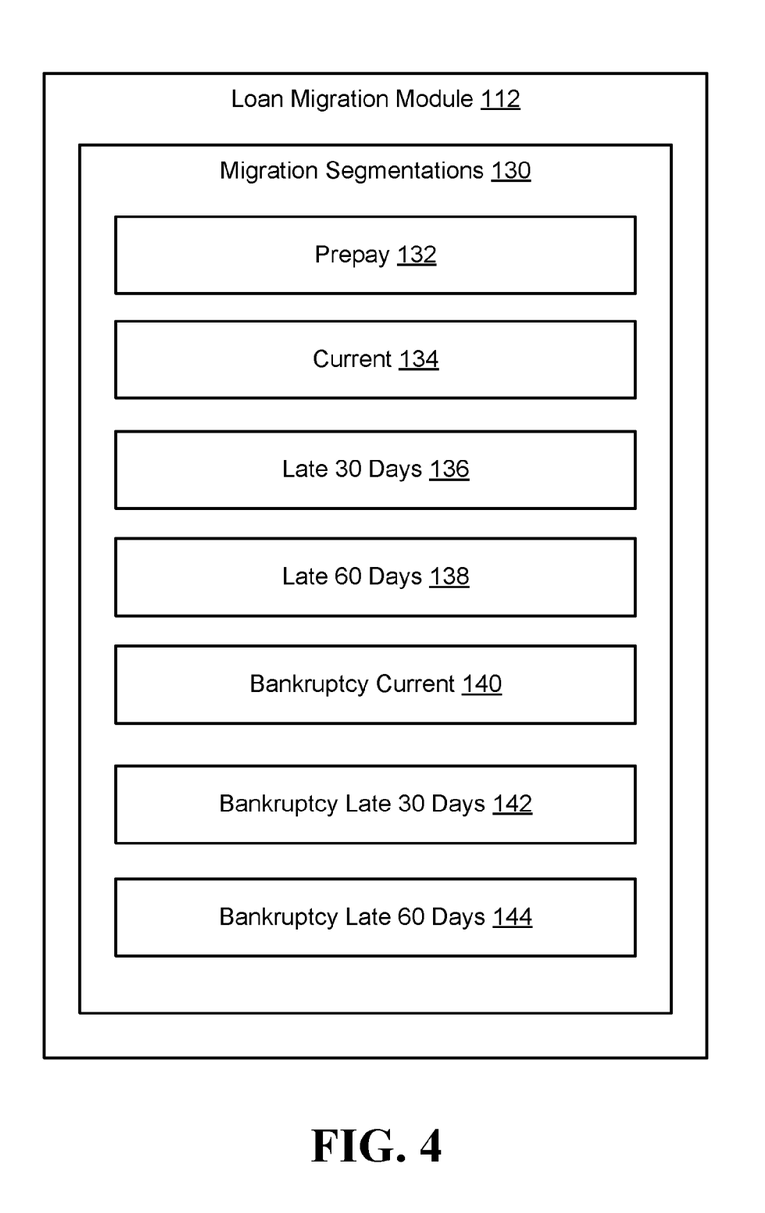
FIG. 4 is a block diagram of a loan migration module within a loan resolution application, in accordance with one embodiment of the present invention.

Loan mitigation module 112 is configured to predict future loan states for loan accounts identified as having a current loan state of less than 90 days late. For example, loan mitigation module 112 may be configured to predict future loan states for new/proposed loan accounts, current loan accounts, 30 day late loan accounts, 60 day late loan accounts and the like. FIG. 4, discussed infra. provides details related to exemplary future loan states, otherwise referred to as migration segmentations, resulting from executing the loan migration module 112.

Figure 5:
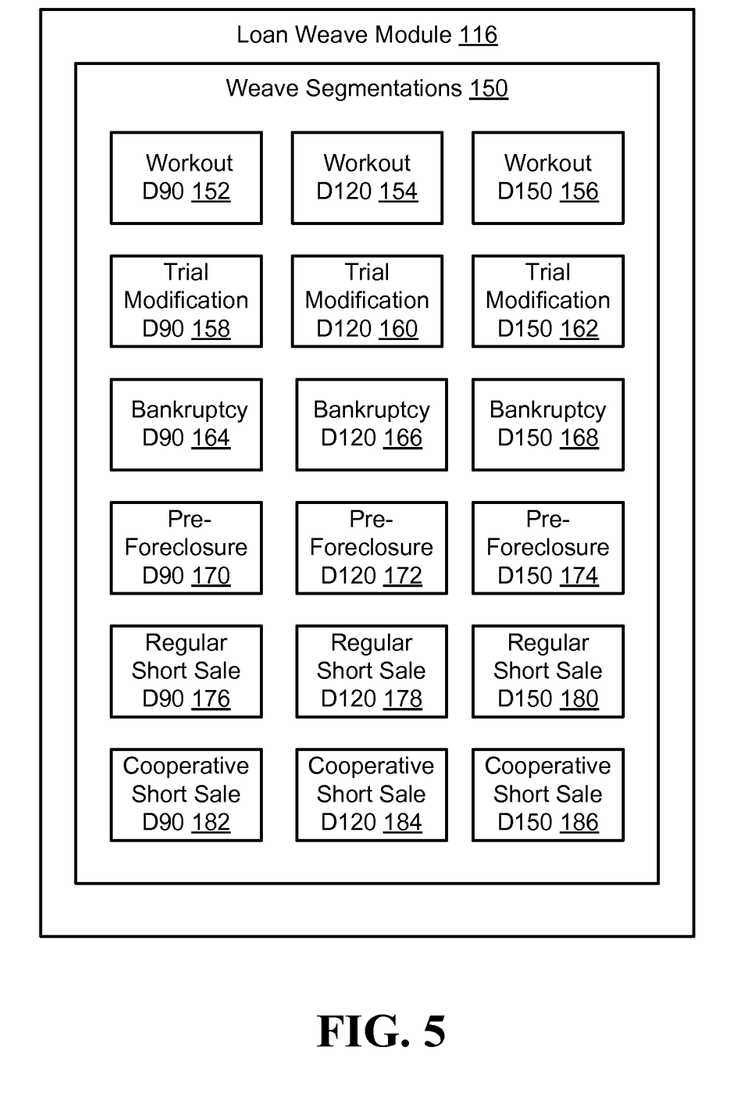
FIG. 5 is a block diagram of a loan weave module within a loan resolution application, in accordance with embodiments of the present invention.

Loan weave module 114 is configured to predict future loan states for loans accounts identified as having a current loan state between ninety (90) days and one-hundred and seventy-nine (179) days late. For example, loan weave module 114 may be configured to predict future loan states for ninety (90) day late loan accounts, one-hundred and twenty (120) day late loan accounts and one-hundred and fifty (150) day late loan accounts. In such embodiments of the invention, the loan weave module may be further configured to consider both lateness status and servicing status simultaneously. Lateness status refers to the number of days that the loan is account is late, while servicing status refers to whether an action has been taken on the loan account, such as foreclosure, bankruptcy, modification, workout, short sale or the like. FIG. 5, discussed infra. provides details related to exemplary future loan states, otherwise referred to as weave segmentations, resulting from executing the loan weave module 114.

Figure 6:
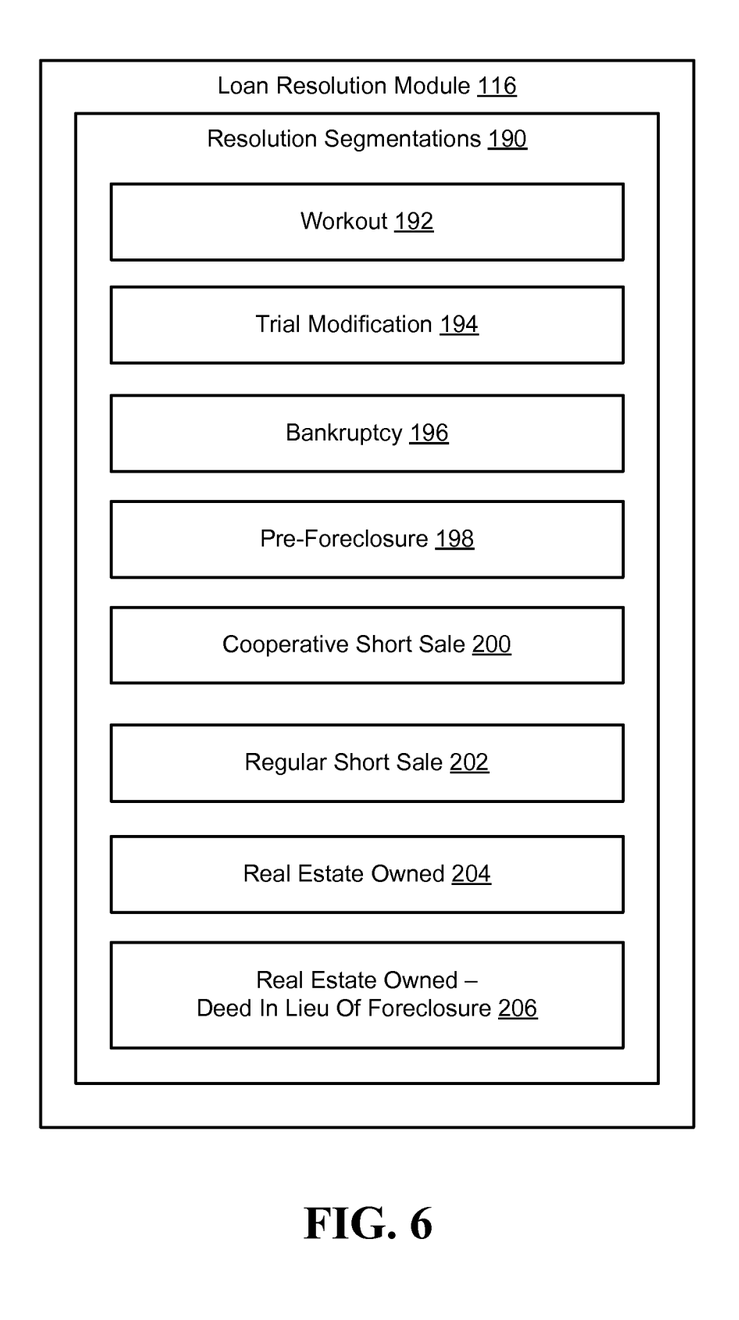
FIG. 6 is a block diagram of a loan resolution module within a loan resolution application, in accordance with embodiments of the present invention.

Loan resolution module 116 is configured to predict future loan states for loan accounts identified as having a current loan state of greater than or equal to one-hundred and eighty (180) days late. FIG. 6, discussed infra. provides details related to exemplary future loan states, otherwise referred to as resolution segmentations, resulting from executing the loan resolution module 116.

Figure 3:
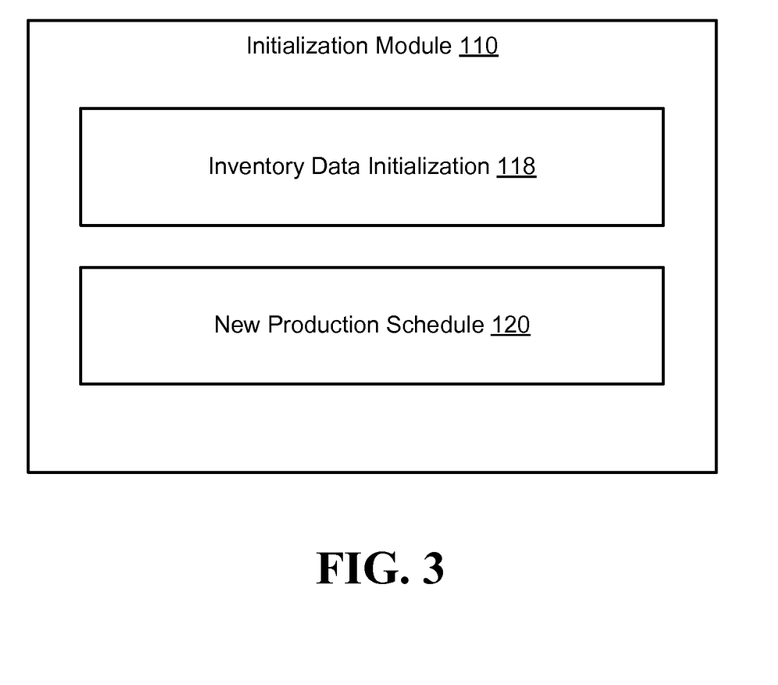
FIG. 3 is a block diagram of an initialization module within a loan resolution application, in accordance with embodiments of the present invention.

Turning the reader's attention to FIG. 3, a block diagram of a data initialization module 110 included within the loan resolution application 108 is depicted. The initialization module 110 includes inventory data initialization 118 configured to read-in/assess actual current loan account inventory data to identify the current loan state of one or more, typically all, of the currently inventoried loan accounts. Additionally, data initialization module 110 includes new production schedule 120 configured to readin/assess scheduled new loan account data for scheduled new loan accounts which may be scheduled to open during the ensuing prediction time period, for example, scheduled to open in the ensuing month or the like. It should be noted that scheduled new loan accounts will characteristically have a current loan state of "current" since the loan accounts have yet to be opened.

FIG. 4 provides a block diagram of loan mitigation module 112 which is configured to predict future loan states for loan accounts identified as having a current loan state of less than 90 days late, including those loan accounts which currently have a loan state of "current". In specific embodiments, the loan mitigation module 112 is configured to predict loan states based on historical aggregated loan-level data, such as dynamic or static predictive loan attributes. The future loan states predicted by the loan mitigation module 112, otherwise referred to as mitigation segmentations 130 or migration buckets, may include, but are not necessarily limited to, pre-pay 132, current 134, late thirty (30) days 136, late sixty (60) days 138, bankruptcy and current 140, bankruptcy and late thirty (30) days 142 and bankruptcy and late sixty (60) days 144.

FIG. 5 provides a block diagram of a loan weave module 114 configured to predict future loan states for loan accounts having a current loan state between ninety (90) days and one-hundred and seventy-nine (179) days late. In specific embodiments, the loan weave module 114 is configured to predict loan states based on historical aggregated loan-level data, such as dynamic or static predictive loan attributes. The future loan states predicted by the loan weave module 114, otherwise referred to as weave segmentations 150 or weave buckets, may include, but are not necessarily limited to, work-out and ninety (90) days late 152, workout and one-hundred and twenty (120) days late 154, and workout and one-hundred and fifty (150) days late 156. The weave segmentations 150 may also include trial modification and ninety (90) days late 158, trial modification and one-hundred and twenty (120) days late and trial modification and one-hundred and fifty (150) days late. In addition, weave segmentations 150 may include bankruptcy and ninety (90) days late 164, bankruptcy and one-hundred and twenty (120) days late 166 and bankruptcy and one-hundred and fifty (150) days late 168.

Moreover, weave segmentations 150 may include pre-foreclosure and ninety (90) days late 170, pre-foreclosure and one-hundred and twenty (120) days late 172 and pre-foreclosure and one-hundred and fifty (150) days late. In addition, weave segmentations 150 may include regular short sale and ninety (90) days late 176, regular short sale and one-hundred and twenty (120) days late 178 and regular short sale and one-hundred and fifty (150) days late 180. Additionally, weave segmentations 150 may include cooperative short sale and ninety (90) days late 182, cooperative short sale and one-hundred and twenty (120) days late 184 and cooperative short sale and one-hundred and fifty (150) days late 186.

FIG. 6 provides a block diagram of a loan resolution module 116 configured to predict future loan states for loans accounts having a current loan state of greater than or equal to one-hundred and eighty (180) days late. In specific embodiments, the loan resolution module 116 is configured to predict loan states based on historical aggregated loan-level data, such as dynamic or static predictive loan attributes. The future loan states predicted by the loan resolution module 116, otherwise referred to as resolution segmentations 190 or resolution buckets may include, but are not necessarily limited to, workout 192, trial modification 194, bankruptcy 196, pre-foreclosure 198, cooperative short sale 200, regular short sale 202, real estate owned (REO) 204 and REO/deed in lieu of foreclosure 206.

Figure 7:
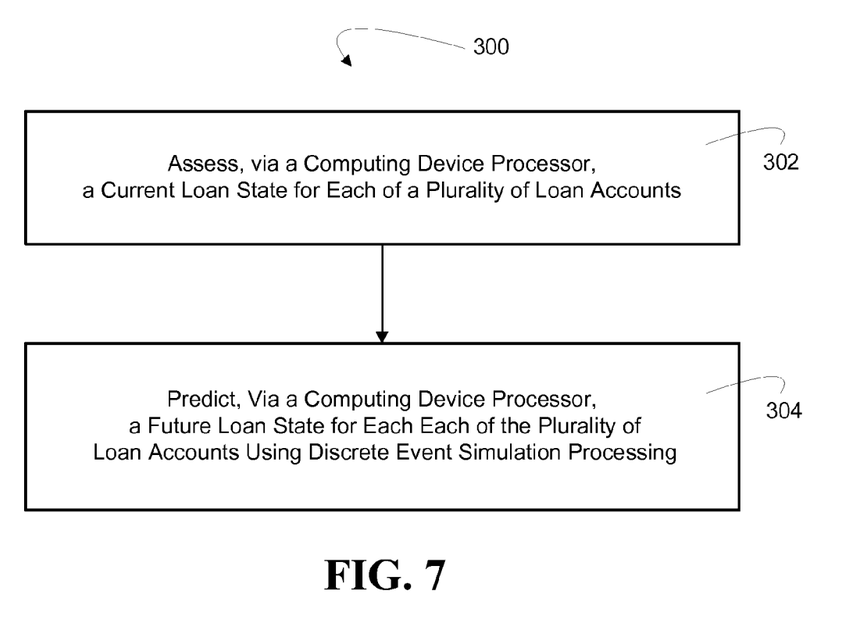
FIG. 7 is a flow diagram of a method for loan resolution prediction, in accordance with embodiments of the present invention.

Referring to FIG. 7 a flow diagram is presented of a method 300 for loan resolution, in accordance with embodiments of the present invention. At Event 302, a current loan state is identified for one or more loan accounts. In specific embodiments, the loan accounts may include currently inventoried loan accounts and newly scheduled loan accounts. As previously noted, in those embodiments in which loan resolution modeling is performed on a regularly scheduled basis, such as monthly, all or a substantial portion of all inventoried loan accounts and newly scheduled accounts may undergo loan resolution modeling. In specific embodiments, identification of the current loan state may entail retrieving or receiving data feeds or the like that indicate the current loan state/status.

In further embodiments the method may also include identifying, for each of the one or more loan accounts, a current loan state grouping from amongst a plurality of loan state groupings. In such embodiments, the current loan state grouping defines an appropriate methodology for predicting a future loan state, such as the loan migration module processing, the loan weave module processing and the loan resolution module processing discussed above. In such embodiments of the invention a first current loan state grouping may include loan accounts currently less than ninety days late, a second current loan state grouping may include loan accounts currently ninety to one-hundred and seventy-nine days late and a third current loan state grouping may include loan accounts currently greater than or equal to one-hundred and eighty days late.

At Event 304, a future loan state is predicted for each of the plurality of loan accounts based on the current loan state. The prediction of the future loan state is based on implementation of Discrete Event Simulation (DES) processing which provides for modeling of system as it changes over time. The foundation of the model is arrival of loan accounts that progress in the model for a duration equivalent to the forecasting window, e.g., three years/36 months. The prediction may be based on historical loan resolution data such as dynamic and state predictive loan attributes. Example of dynamic predictive variables include, but are not limited to, interest rates, unemployment rates, Market-to-Market Combined Loan-to-Value (MCLTV), Home Price Index (HPI), loan age, home price momentum, payment shock and the like. Examples of static predictive variables include, but are not limited to, credit scores, such as Fair Isaac Corporation (FICO) scores and the like, origination Loan-to-Value (LTV), origination CLTV, loan age, loan product type, household income, occupancy status, loan purpose, loan size, amortization term, property type, number of borrowers associated with the loan and the like. The modeling predictions may be portioned according to the current state of the loan account, such as less than 90 days late, between 60 and 179 days late and 180 days or greater late.

Thus, methods apparatus systems and computer program products are described herein that provide for loan lifecycle modeling using Discrete Event Simulation methodology. Discrete Event Simulation (DES) allows for modeling to occur at the customer and/or account level, such that the process captures customer-specific or loan-specific attributes/exposure factors, such as, but not limited to, credit score(s), House Price Index (HPI), loan product type, unemployment rates, interest rates and the like. Such modeling takes into the account that loan events occur at random paces and are typically dependent on ancillary factors, such as, availability of financial resources, market demand, customer attributes and the like, which all tend to be stochastic by nature. Such modeling and understanding of the customer relationship lifecycle and specifically in terms of loan resolution lifecycle, provides financial institutions tremendous opportunities for making informed management decisions that impact customer service.

While the foregoing disclosure discusses illustrative embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any embodiment may be utilized with all or a portion of any other embodiment, unless stated otherwise.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A method for providing loan resolution modeling, the method comprising:
   identifying, via a computing device processor, a current loan state for one or more financial institution loan accounts;
   identifying, via a computing device processor, for each of the one or more loan accounts, a current loan state grouping from amongst a plurality of current loan state groupings; and
   predicting, via a computing device processor, a future loan state for each of the one or more financial institution loan accounts based on (i) the current loan state, (ii) the identified current loan state grouping, and (iii) historical loan account-specific data, wherein the future loan state is for a predetermined time interval and wherein Discrete Event Simulation processing is implemented to determine the future loan state;
   wherein predicting the future loan state further comprises predicting, via the computing device processor, the future loan state based on one or more predictive dynamic loan variables, wherein the predictive dynamic loan variables include one or more of interest rates, unemployment rates, market-to-market combined loan-to-value, loan age, home price index, home price momentum or payment shock.

2. The method of claim 1, wherein predicting the future loan state further comprises predicting, via the computing device processor, the future loan state based on historical aggregated loan account data.

3. The method of claim 1, wherein predicting the future loan state further comprises predicting, via the computing device processor, the future loan state based on one or more predictive static loan variables.

4. The method of claim 3, wherein predicting the future loan state further comprises predicting, via the computing device processor, the future loan state based on the one or more predictive static loan variables, wherein the predictive static loan variables include credit scores, origination loan-to-value, origination combined loan-to-value, loan age, household income, occupancy status, loan product type, loan purpose, loan amount, amortization term, property type or number of borrowers.

5. The method of claim 1, wherein identifying the current loan state further comprises identifying, via the computing device processor, the current loan state based on currency or lateness of the one or more loan accounts.

6. The method of claim 1, wherein identifying the current loan state grouping further comprises identifying, via a computing device processor, for each of the one or more loan accounts, the current loan state grouping from amongst the plurality of current loan state groupings, wherein the plurality of current loan state groupings include a first grouping that includes loan accounts currently less than ninety days late, a second grouping that includes loan accounts currently ninety to one hundred and seventy-nine days late and a third grouping that includes loan accounts currently greater than or equal to one hundred and eighty days late.

7. The method of claim 1, wherein identifying the current loan state further comprises identifying, via the computing device processor, a plurality of existing loan accounts and a plurality of planned new loan accounts opening during an ensuing time period defined by the predetermined time interval.

8. An apparatus for modeling loan resolution, the apparatus comprising: a computing platform including a processor and a memory in communication with the processor;
   a loan resolution application stored in the memory, executable by the processor and configured to identify a current loan state for each of one or more financial institution loan accounts, identify, for each of the one or more loan accounts, a current loan state grouping from amongst a plurality of current loan state groupings, and predict a future loan state for each of the one or more financial institution loan accounts based on (i) the current loan state, (ii) the identified current loan state grouping, and (iii) historical loan account-specific data, wherein the future loan state is for a predetermined time interval and wherein Discrete Event Simulation processing is implemented to determine the future loan state;
   wherein the loan resolution application is further configured to predict the future loan state based on one or more predictive dynamic loan variables, wherein the predictive dynamic loan variables include one or more of interest rates, unemployment rates, market-to-market combined loan-to-value, loan age, home price index, home price momentum or payment shock.

9. The apparatus of claim 8, wherein the loan resolution application is further configured to predict the future loan state based on historical aggregated loan account data.

10. The apparatus of claim 8, wherein the loan resolution application is further configured to predict the future loan state based on one or more predictive static loan variables.

11. The apparatus of claim 10, wherein the loan resolution application is further configured to predict the future loan state based on the one or more predictive static loan variables, wherein the predictive static loan variables include credit scores, origination loan-to-value, origination combined loan-to-value, loan age, household income, occupancy status, loan product type, loan purpose, loan amount, amortization term, property type or number of borrowers.

12. The apparatus of claim 8, wherein the loan resolution application is further configured to identify the current loan state based on currency or lateness of the one or more loan accounts.

13. The apparatus of claim 8, wherein the loan resolution application includes an initialization module configured to identity the current loan state for each of the one or more loans based on loan inventory data and planned new loan accounts.

14. The apparatus of claim 8, wherein the loan resolution application further comprises a loan migration module configured to predict the future loan state of loan accounts currently residing in a loan state grouping defined by loan accounts currently less than ninety (90) late.

15. The apparatus of claim 8, wherein the loan resolution application further comprises a loan weave module configured to predict the future loan state of loan accounts currently residing in a loan state grouping defined by loan accounts currently ninety (90) to one-hundred and seventy-nine (179) days late.

16. The apparatus of claim 8, wherein the loan resolution application further comprises a loan resolution module configured to predict the future loan state of loan accounts currently residing in a loan state grouping defined by loan accounts greater than or equal to one-hundred and eighty (180) days late.

17. A computer program product including a non-transitory computer-readable medium, the medium comprising:
- a first set of codes for causing a computer to identify (i) a current loan state for one or more financial institution loan accounts and (ii), for each of the one or more loan accounts, a current loan state grouping from amongst a plurality of current loan state groupings; and
- a second set of codes for causing a computer to predict a future loan state for each of the one or more financial institution loan accounts based on (i) the current loan state, (ii) the identified current loan state grouping, and (iii) historical loan account-specific data, wherein the future loan state is for a predetermined time interval and wherein Discrete Event Simulation processing is implemented to determine the future loan state;
- wherein the second set of codes is further configured to cause the computer to predict the future loan state based on one or more predictive dynamic loan variables, wherein the predictive dynamic loan variables include one or more of interest rates, unemployment rates, market-to-market combined loan-to-value, loan age, home price index, home price momentum or payment shock.

18. The computer program product of claim 17, wherein the second set of codes is further configured to cause the computer to predict the future loan state based on historical aggregated loan account data.

19. The computer program product of claim 17, wherein the second set of codes is further configured to cause the computer to predict the future loan state based on one or more predictive static loan variables.

20. The computer program product of claim 19, wherein the second set of codes is further configured to cause the computer to predict the future loan state based on the one or more predictive static loan variables, wherein the predictive static loan variables include credit scores, origination loan-to-value, origination combined loan-to-value, loan age, household income, occupancy status, loan product type, loan purpose, loan amount, amortization term, property type or number of borrowers.

21. The computer program product of claim 17, wherein the first set of codes is further configured to cause the computer to identify the current loan state based on currency or lateness of the one or more loan accounts.

22. The computer program product of claim 17, wherein the first set of codes is further configured to cause the computer to identify, for each of the one or more loan accounts, the current loan state grouping from amongst the plurality of current loan state groupings, wherein the plurality of current loan state groupings include a first grouping that includes loan accounts currently less than ninety days late, a second grouping that includes loan accounts currently ninety to one hundred and seventy-nine days late and a third grouping that includes loan accounts currently greater than or equal to one hundred and eighty days late.

23. The computer program product of claim 17, wherein the first set of codes is further configured to cause the computer to identity a plurality of existing loan accounts and a plurality of planned new loan accounts opening during an ensuing time period defined by the predetermined time interval.

* * * * *